C. O. WHITNELL.
STOCK WATERER.
APPLICATION FILED JULY 8, 1919.
1,368,216. Patented Feb. 8, 1921.
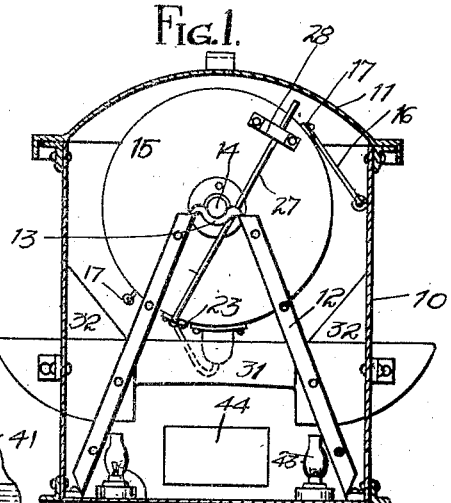

UNITED STATES PATENT OFFICE.

CHARLES O. WHITNELL, OF DES MOINES, IOWA.

STOCK-WATERER.

1,368,216.      Specification of Letters Patent.      Patented Feb. 8, 1921.

Application filed July 8, 1919. Serial No. 309,409.

*To all whom it may concern:*

Be it known that I, CHARLES O. WHITNELL, a citizen of the United States, and a resident of Des Moines, in the county of Polk and State of Iowa, have invented a certain new and useful Stock-Waterer, of which the following is a specification.

The object of my invention is to provide a stock watering device of simple, durable and inexpensive construction.

More particularly it is my object to provide a stock watering device comprising a casing, supporting means therein, and a tank rotatably mounted, said tank having an outlet opening and a controllable valve therefor.

With these and other objects in view my invention consists in the construction, arrangement and combination of the various parts of the device, whereby the objects contemplated are attained, as hereinafter more fully set forth, pointed out in my claim and illustrated in the accompanying drawings, in which:

Figure 1 shows a vertical, sectional view through one end of the casing showing the parts therein in side elevation.

Fig. 2 shows a vertical, sectional view through a modified form of one end of the trough.

Fig. 3 shows a top or plan view of the device with the cover removed.

Fig. 4 shows an enlarged, sectional view of the trough installed in the casing; and Fig. 5 shows a detail, sectional view of the casing and valve for controlling the outlet opening of the tank.

In the accompanying drawings I have used the reference numeral 10 to indicate generally a casing having a bottom and side walls.

The casing is provided with a removable cover 11. Within the casing at each end thereof is a supporting frame 12. The frame 12 may be made of angle iron in the form of an inverted V. At the upper end of the frame one of the angles of the angle iron is cut away, and the other angle is bent to form a half journal 13 for a spindle 14.

I provide a cylindrical tank 15 having at its ends the spindles 14 resting in the journals 13, whereby the tank is mounted for rotation.

Pivoted to the frame is a hook 16 adapted to coact with eyes or the like 17, whereby the tank may be fastened with its outlet opening up or down. The wall of the tank is provided with an opening 18 outside of which is provided a valve casing 19 having an opening 20. The valve casing around the opening 20 forms a seat for a ball valve 21. Over the opening 18 is arranged a screen 22.

Rotatably mounted in bearings 23 on the wall of the tank 15 is a rod 24 having at one end a portion 25 extending away from the body of the rod at a proper angle thereto.

The portion 25 terminates in a bent portion 26 adapted to project into the opening 20, and in certain positions of the rod 24 to engage the ball 21 and force it away from its seat.

At the other end of the rod 24 is a handle portion 27 extending alongside one end of the tank and through a yoke 28. The yoke 28 is of resilient material and is provided with a portion 29 projecting toward the tank 15, so that when the handle 27 is moved to other of its positions it cannot be moved past the portion 29 without slightly springing the yoke. Thus the handle 27 will be held in either of its adjusted positions. In one of its positions the portion 26 is held out of engagement with the ball 21, while in another position of the handle 27 the member 26 holds the ball 21 away from its seat.

In filling the tank, the handle 27 is moved to position so that the ball 21 is allowed to seat; the hook 16 is disengaged, and the tank is rotated until its opening 18 is up. It will, of course, be understood that the cover 11 will have been removed before attempting to manipulate the tank. The tank is then filled through the openings 20 and 18 by means of a hose or other suitable device, and is turned over until the opening 18 is down, in which position the device is designed to be used. The handle 27 is then manipulated for moving the ball 21 away from its seat, whereupon the contents of the tank may escape freely through the openings 18 and 20.

The opposite side walls of the casing 10 are provided with openings 30 below the level of the tank 15, and projected through said openings is a trough 31.

The portions of the wall of the casing 10 are bent back at each side of the trough to form side wings 32.

The bottom of the tank is inclined from its central portion downwardly toward its ends, as indicated at 33 in Fig. 4. Near the ends of the tank the bottom is lower than at the other portions as indicated at 34. The bottom of the tank is provided with substantially vertical shoulders 35, at the inner ends of the deeper portions of the tank. A false bottom 36 is provided below the bottom portions 34, as indicated in Figs. 2 and 4.

The false bottom projects into the casing as shown. The false bottom is provided with ventilation openings 37 near the upper outer end of the trough.

At the bottom of each lower bottom portion 34 is an outlet opening 38 for which any suitable closure device 39 may be provided. Above each shoulder 35 there is provided a transverse partition 40 near each end of the trough.

The wall of the casing 10 just above the trough is bent inwardly as at 41, and the portion 41 terminates just above the shoulder 40 at each end of the trough. Each partition 40 is provided with an opening or openings 42 at its lower portion for permitting water to flow from the central part of the trough outwardly into the lower portion at the end thereof.

I preferably provide heating devices such, for instance, as the lamps 43 under each lower trough portion within the casing 10.

The casing 10 may be provided with a door 44 for permitting convenient access to the heating devices. In Fig. 2 I have shown a slightly modified form of the trough in which the false bottom does not extend so far into the tank.

It is, of course, obvious that various kinds of heating devices could be used with my invention.

In the practical use of my watering device, assuming that the tank has been filled and that the valve 21 is not seated, then water will flow down into the trough. The valve casing 19 projects into the trough so that the water will flow into the trough until it reaches the level of the opening 20 when a water seal will be formed and no more water will flow out of the tank until the water in the trough is lowered. Water will flow downwardly from the central part of the tank to and through the partition 40, so that the central portion of the trough will be self-cleaning. When it is desired to clean the lower outer ends of the trough the closure member 39 may be removed and the outer end of the trough may be flushed and easily cleaned.

It will, of course, be understood that the clean out passage or opening 38 is at the lower part of the end of the trough.

The opening 42 may be closed by one of the devices 39 when desired as for instance where my device is located with the opposite ends of the trough on different sides of a line fence and it is desired to use one end of the trough only.

It will be seen that I have provided a watering device including a trough which may be readily and easily kept sanitary.

It is easy to clean out the lower ends of the trough by using the water from the tank, or by using water flushed into the ends of the trough in any way.

When the device is in use, the tank will be surrounded by warm air. Warm air from the interior of the tank will also pass upwardly between the bottom 34 and the false bottom 36, at each end of the tank for warming that portion of the casing 10 near the part of the trough which projects beyond the casing 10.

Some changes may be made in the construction and arrangement of the parts of my improved watering device without departing from the essential features and purposes of my invention, and it is my intention to cover by my claim any modified forms of structure or use of mechanical equivalents which may be reasonably included within its scope.

I claim as my invention:

In a device of the class described, a frame, a tank mounted thereon for rotation, a trough below said tank, said tank having thereon a member provided with a discharge opening, and adapted to project into the trough when the tank is rotated to position with said member downwardly, a valve for controlling the discharge of water through said member, a rod rotatably mounted on said tank near said member, having a member thereon formed with a portion projecting into said discharge opening, and adapted to control said valve, a handle on said rod extending adjacent to the end of said tank, and means for holding said handle in different positions of its movement.

Des Moines, Iowa, June 18, 1919.

CHARLES O. WHITNELL.